United States Patent
Corbin et al.

(10) Patent No.: US 6,705,777 B2
(45) Date of Patent: Mar. 16, 2004

(54) SYSTEM AND METHOD FOR DIGITAL FILM DEVELOPMENT USING VISIBLE LIGHT

(75) Inventors: Douglas E. Corbin, Austin, TX (US); Robert S. Young, Jr., Austin, TX (US); Stacy S. Cook, Austin, TX (US); Alexei L. Krasnoselsky, Austin, TX (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/226,673

(22) Filed: Aug. 23, 2002

(65) Prior Publication Data

US 2003/0002879 A1 Jan. 2, 2003

Related U.S. Application Data

(63) Continuation of application No. 09/751,378, filed on Dec. 29, 2000, now Pat. No. 6,461,061.
(60) Provisional application No. 60/173,775, filed on Dec. 30, 1999.

(51) Int. Cl.[7] ............................. G03D 5/00; G03D 13/00
(52) U.S. Cl. .................... 396/569; 396/571; 396/604; 355/27; 355/40
(58) Field of Search ........................ 396/564, 567–570, 396/571, 604–606, 617, 620, 626, 627; 355/27–29, 40, 41, 77

(56) References Cited

U.S. PATENT DOCUMENTS

| | | | |
|---|---|---|---|
| 2,404,138 A | 7/1946 | Mayer | |
| 3,520,689 A | 7/1970 | Nagae et al. | |
| 3,520,690 A | 7/1970 | Nagae et al. | |
| 3,587,435 A | 6/1971 | Chioffe | |
| 3,615,479 A | 10/1971 | Kohler et al. | |
| 3,615,498 A | 10/1971 | Aral et al. | |
| 3,617,282 A | 11/1971 | Bard et al. | |
| 3,747,120 A | 7/1973 | Stemme | |

(List continued on next page.)

FOREIGN PATENT DOCUMENTS

| | | |
|---|---|---|
| EP | 0261782 A2 | 8/1987 |
| EP | 0422220 A1 | 9/1989 |

(List continued on next page.)

OTHER PUBLICATIONS

"Photorealistic Ink–Jet Printing Through Dynamic Spot Size Control", D. Wallace, et al., Journal of Imaging Science and Technology, vol. 40, No. 5, pp. 390–395, Sep./Oct. 1996.

"MicroJet Printing of Solder and Polymers for Multi–Chip Modules and Chip–Scale Package", D. Hayes, et al., Micro-Fab Technologies, Inc. (6 pages).

(List continued on next page.)

Primary Examiner—D. Rutledge
(74) Attorney, Agent, or Firm—Dinsmore & Shohl

(57) ABSTRACT

One aspect of the invention is a system for digital dye color film processing. In one embodiment, a developer station applies a processing solution to film to initiate development of metallic silver grains and at least one dye image within the film. A scanning system illuminates the coated film with light having at least one frequency within the visible portion of the electromagnetic spectrum. The light interacts with the silver and at least one dye image within the film. The scanning station measures the light from the film and produces sensor data that is communicated to a data processing system. The data processing system processes the sensor data to produce a digital image. The digital image can then be output to an output device, such as a printer, monitor, memory device, and the like.

23 Claims, 8 Drawing Sheets

U.S. PATENT DOCUMENTS

| | | |
|---|---|---|
| 3,833,161 A | 9/1974 | Krumbein |
| 3,903,541 A | 9/1975 | Vom Meister et al. |
| 3,946,398 A | 3/1976 | Kyser et al. |
| 3,959,048 A | 5/1976 | Stanfield et al. |
| 4,026,756 A | 5/1977 | Stanfield et al. |
| 4,081,577 A | 3/1978 | Horner |
| 4,142,107 A | 2/1979 | Hatzakis et al. |
| 4,215,927 A | 8/1980 | Grant et al. |
| 4,249,985 A | 2/1981 | Stanfield |
| 4,265,545 A | 5/1981 | Slaker |
| 4,301,469 A | 11/1981 | Modeen et al. |
| 4,490,729 A | 12/1984 | Clark et al. |
| 4,501,480 A | 2/1985 | Matsui et al. |
| 4,564,280 A | 1/1986 | Fukuda |
| 4,594,598 A | 6/1986 | Iwagami |
| 4,621,037 A | 11/1986 | Kanda et al. |
| 4,623,236 A | 11/1986 | Stella |
| 4,633,300 A | 12/1986 | Sakai |
| 4,636,808 A | 1/1987 | Herron |
| 4,666,307 A | 5/1987 | Matsumoto et al. |
| 4,670,779 A | 6/1987 | Nagano |
| 4,736,221 A | 4/1988 | Shidara |
| 4,741,621 A | 5/1988 | Taft et al. |
| 4,745,040 A | 5/1988 | Levine |
| 4,755,844 A | 7/1988 | Tsuchiya et al. |
| 4,777,102 A | 10/1988 | Levine |
| 4,796,061 A | 1/1989 | Ikeda et al. |
| 4,814,630 A | 3/1989 | Lim |
| 4,821,114 A | 4/1989 | Gebhardt |
| 4,845,551 A | 7/1989 | Matsumoto |
| 4,851,311 A | 7/1989 | Millis et al. |
| 4,857,430 A | 8/1989 | Millis et al. |
| 4,875,067 A | 10/1989 | Kanzaki et al. |
| 4,969,045 A | 11/1990 | Haruki et al. |
| 4,994,918 A | 2/1991 | Lingemann |
| 5,034,767 A | 7/1991 | Netz et al. |
| 5,101,286 A | 3/1992 | Patton |
| 5,124,216 A | 6/1992 | Giapis et al. |
| 5,155,596 A | 10/1992 | Kurtz et al. |
| 5,196,285 A | 3/1993 | Thomson |
| 5,200,817 A | 4/1993 | Birnbaum |
| 5,212,512 A | 5/1993 | Shiota |
| 5,231,439 A | 7/1993 | Takahashi et al. |
| 5,235,352 A | 8/1993 | Pies et al. |
| 5,255,408 A | 10/1993 | Blackman |
| 5,266,805 A | 11/1993 | Edgar |
| 5,267,030 A | 11/1993 | Giorgianni et al. |
| 5,292,605 A | 3/1994 | Thomson |
| 5,296,923 A | 3/1994 | Hung |
| 5,334,247 A | 8/1994 | Columbus et al. |
| 5,350,651 A | 9/1994 | Evans et al. |
| 5,350,664 A | 9/1994 | Simons |
| 5,357,307 A | 10/1994 | Glanville et al. |
| 5,360,701 A | 11/1994 | Elton et al. |
| 5,371,542 A | 12/1994 | Pauli et al. |
| 5,391,443 A | 2/1995 | Simons et al. |
| 5,414,779 A | 5/1995 | Mitch |
| 5,416,550 A | 5/1995 | Skye et al. |
| 5,418,119 A | 5/1995 | Simons |
| 5,418,597 A | 5/1995 | Lahcanski et al. |
| 5,432,579 A | 7/1995 | Tokuda |
| 5,436,738 A | 7/1995 | Manico |
| 5,448,380 A | 9/1995 | Park |
| 5,452,018 A | 9/1995 | Capitant et al. |
| 5,465,155 A | 11/1995 | Edgar |
| 5,477,345 A | 12/1995 | Tse |
| 5,496,669 A | 3/1996 | Pforr et al. |
| 5,516,608 A | 5/1996 | Hobbs et al. |
| 5,519,510 A | 5/1996 | Edgar |
| 5,546,477 A | 8/1996 | Knowles et al. |
| 5,550,566 A | 8/1996 | Hodgson et al. |
| 5,552,904 A | 9/1996 | Ryoo et al. |
| 5,563,717 A | 10/1996 | Koeng et al. |
| 5,568,270 A | 10/1996 | Endo |
| 5,576,836 A | 11/1996 | Sano et al. |
| 5,581,376 A | 12/1996 | Harrington |
| 5,587,752 A | 12/1996 | Petruchik |
| 5,596,415 A | 1/1997 | Cosgrove et al. |
| 5,627,016 A | 5/1997 | Manico |
| 5,649,260 A | 7/1997 | Wheeler et al. |
| 5,652,936 A * | 7/1997 | Klees et al. ............... 396/564 |
| 5,664,253 A | 9/1997 | Meyers |
| 5,664,255 A | 9/1997 | Wen |
| 5,667,944 A | 9/1997 | Reem et al. |
| 5,678,116 A | 10/1997 | Sugimoto et al. |
| 5,691,118 A | 11/1997 | Haye |
| 5,695,914 A | 12/1997 | Simon et al. |
| 5,698,382 A | 12/1997 | Nakahanada et al. |
| 5,726,773 A | 3/1998 | Mehlo et al. |
| 5,739,897 A | 4/1998 | Frick et al. |
| 5,771,102 A | 6/1998 | Vogt et al. |
| 5,790,277 A | 8/1998 | Edgar |
| 5,835,795 A | 11/1998 | Craig et al. |
| 5,835,811 A | 11/1998 | Tsumura |
| 5,845,169 A * | 12/1998 | Patton et al. ............... 396/627 |
| 5,870,172 A | 2/1999 | Blume |
| 5,880,819 A | 3/1999 | Tanaka et al. |
| 5,892,595 A | 4/1999 | Yamakawa et al. |
| 5,907,391 A * | 5/1999 | Kobayashi et al. ............ 355/40 |
| 5,930,388 A | 7/1999 | Murakami et al. |
| 5,959,720 A | 9/1999 | Kwon et al. |
| 5,963,662 A | 10/1999 | Vachtsevanos et al. |
| 5,966,465 A | 10/1999 | Keith et al. |
| 5,979,011 A | 11/1999 | Miyawaki et al. |
| 5,982,936 A | 11/1999 | Tucker et al. |
| 5,982,937 A | 11/1999 | Accad |
| 5,982,941 A | 11/1999 | Loveridge et al. |
| 5,982,951 A | 11/1999 | Katayama et al. |
| 5,988,896 A | 11/1999 | Edgar |
| 5,991,444 A | 11/1999 | Burt et al. |
| 5,998,109 A | 12/1999 | Hirabayashi |
| 6,000,284 A | 12/1999 | Shin et al. |
| 6,005,987 A | 12/1999 | Nakamura et al. |
| 6,031,595 A * | 2/2000 | Ueda et al. .................. 355/28 |
| 6,065,824 A | 5/2000 | Bullock et al. |
| 6,069,714 A | 5/2000 | Edgar |
| 6,088,084 A | 7/2000 | Nishio |
| 6,089,687 A | 7/2000 | Helterline |
| 6,099,174 A * | 8/2000 | Feumi Jantou et al. ...... 396/606 |
| 6,101,273 A | 8/2000 | Matama |
| 6,102,508 A | 8/2000 | Cowger |
| 6,137,965 A | 10/2000 | Burgeios et al. |
| 6,200,738 B1 | 3/2001 | Takano et al. |

FOREIGN PATENT DOCUMENTS

| | | |
|---|---|---|
| EP | 0482790 B1 | 9/1991 |
| EP | 0525886 A | 7/1992 |
| EP | 0580293 A1 | 1/1994 |
| EP | 0601364 A1 | 6/1994 |
| EP | 0669753 A | 2/1995 |
| EP | 0768571 A2 | 4/1997 |
| EP | 0794454 A2 | 9/1997 |
| EP | 0806861 A1 | 11/1997 |
| EP | 0878777 A2 | 11/1998 |
| EP | 0930498 A2 | 7/1999 |
| WO | WO 9001240 | 2/1990 |
| WO | WO 9109493 | 6/1991 |
| WO | WO 9725652 | 7/1997 |
| WO | WO 9831142 | 7/1997 |
| WO | WO 9819216 A | 5/1998 |
| WO | WO 9825399 A | 6/1998 |

| WO | WO 9834157 A2 | 8/1998 |
| WO | WO 9834397 | 8/1998 |
| WO | WO 9943148 A1 | 8/1999 |
| WO | WO 0101197 A | 1/2001 |
| WO | WO 0113174 A1 | 2/2001 |
| WO | WO 0145042 A1 | 6/2001 |
| WO | WO 0150192 A1 | 7/2001 |
| WO | WO 0150193 A1 | 7/2001 |
| WO | WO 0150194 A1 | 7/2001 |
| WO | WO 0150197 A1 | 7/2001 |
| WO | WO 0152556 A2 | 7/2001 |

OTHER PUBLICATIONS

"A Method of Characteristics Model of a Drop–on–Demand Ink–Jet Device Using an Integral Method Drop Formation Model", D. Wallace, MicroFab Technologies, Inc., The American Society of Mechanical Engineers, Winter Annual Meeting, pp. 1–9, Dec. 10–15, 1989.

"Digital Imaging Equipment White Papers", Putting Damaged Film on ICE, www.nikonusa.com/reference/whitepapers/imaging, Nikon Corporation, Nov. 28, 2000.

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, 1994, pp. 546–550.

"Anisotropic Spectral Magnitude Estimation Filters for Noise Reduction and Image Enhancement", T. Aach, et al., Philips GmbH Research Laboratories, IEEE, pp. 335–338, 1996.

"Adaptive–neighborhood filtering of images corrupted by signal–dependent noise", R. Rangayyan, et al., Applied Optics, vol. 37, No. 20, pp. 4477–4487, Jul. 10, 1998.

"Grayscale Characteristics", The Nature of Color Images, Photographic Negatives, pp. 163–168.

"Parallel Production of Oligonucleotide Arrays Using Membranes and Reagent Jet Printing", D. Stimpson, et al., Research Reports, Bio Techniques, vol. 25, No. 5, pp. 886–890, 1998.

"Low–Cost Display Assembly and Interconnect Using Ink–Jet Printing Technology", D. Hayes, et al., Display Works '99, MicroFab Technologies, Inc., pp. 1–4, 1999.

"Ink–Jet Based Fluid Microdispensing in Biochemical Applications", D. Wallace, MicroFab Technologies, Inc., Laboratory Automation News, vol. 1, No. 5, pp. 3, 6–9, Nov., 1996.

* cited by examiner

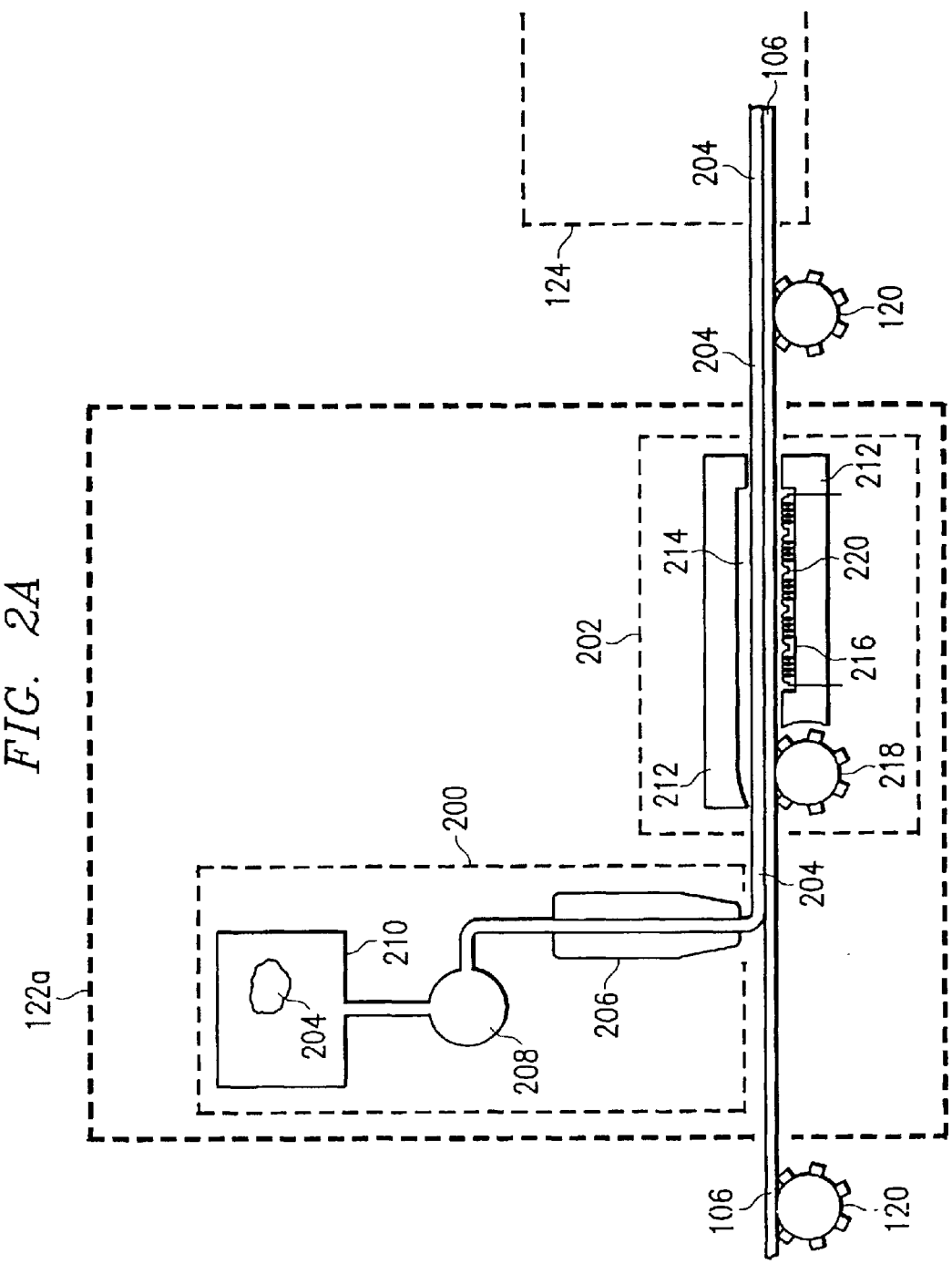

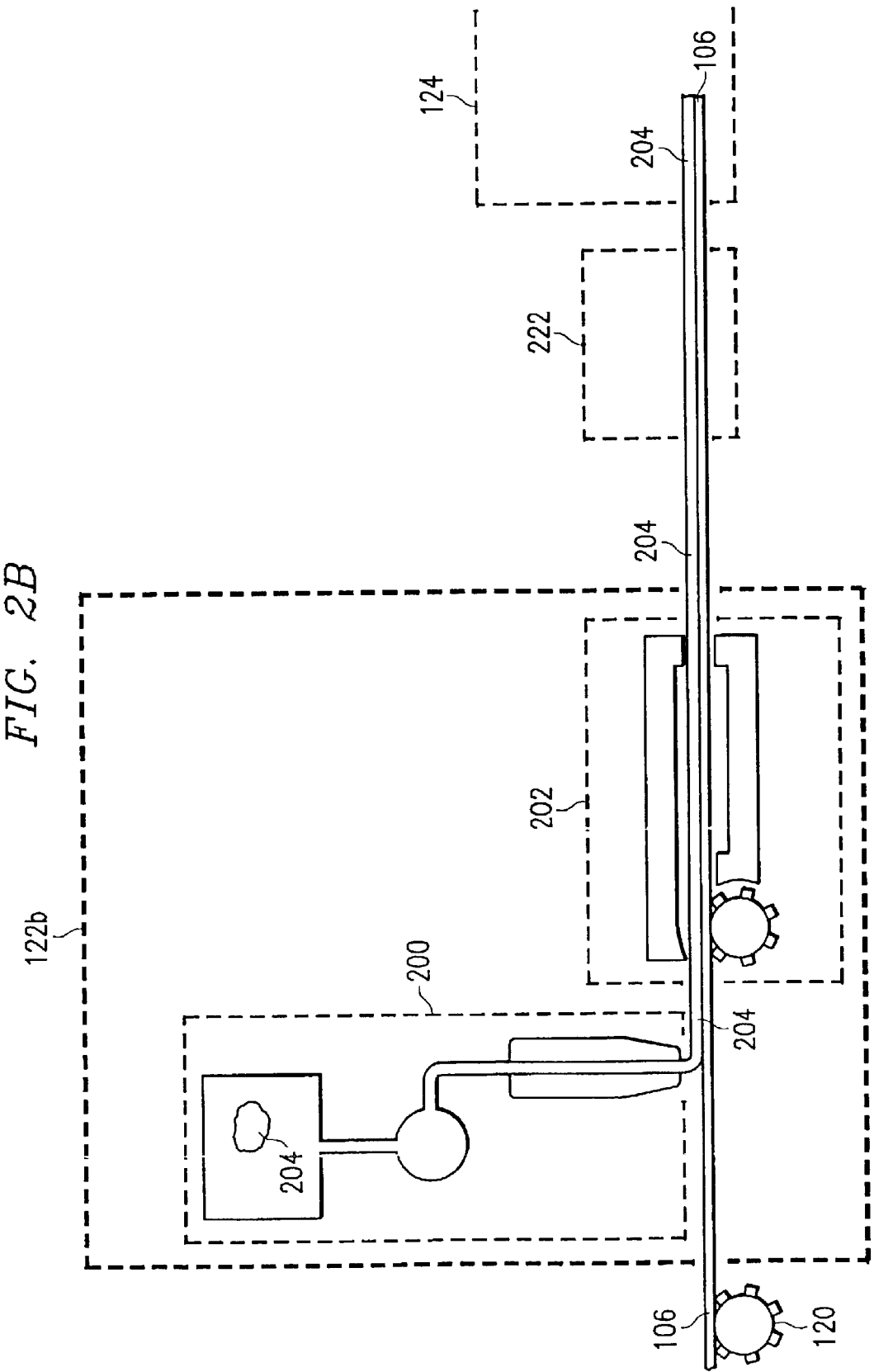

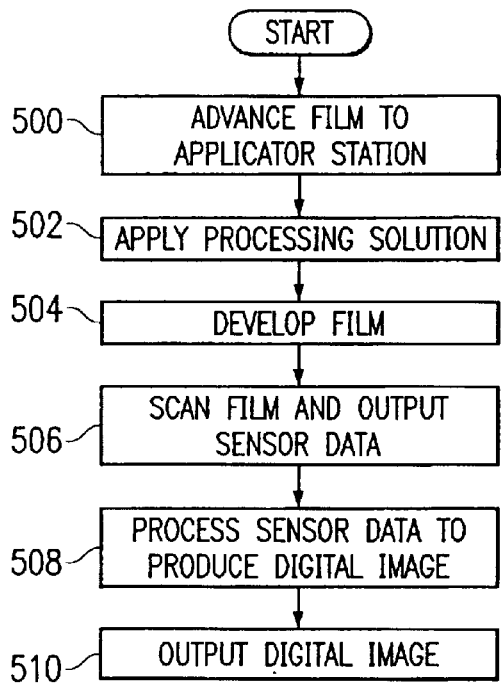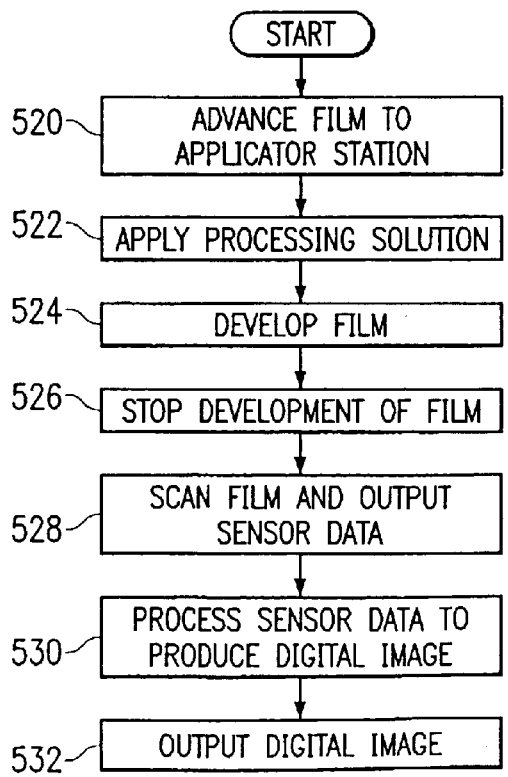

SYSTEM AND METHOD FOR DIGITAL FILM DEVELOPMENT USING VISIBLE LIGHT

RELATED APPLICATION

This application is a continuation of U.S. patent application Ser. No. 09/751,378, filed Dec. 29, 2000, now U.S. Pat. No. 6,461,061, entitled Improved System and Method for Digital Film Development Using Visible Light, which claims the benefit of U.S. Provisional Application No. 60/173,775, filed Dec. 30, 1999, entitled Improved System and Method for Digital Film Development Using Visible Light, the entire disclosures of which are hereby incorporated by reference.

This application is related to the following copending United States Patent Applications: System and Method for Digital Film Development Using Visible Light, Ser. No. 09/752,013, having a priority date of Dec. 30, 1999; Method and System for Capturing Film Images, Ser. No. 09/774,544, having a priority date of Feb. 3, 2000; and System and Method for Digital Dye Color Film Processing, Ser. No. 09/751,473, having a priority date of Dec. 30, 1999; as well as the following abandoned United States Patent Application: Apparatus and Digital Film Processing Method, Ser. No. 09/751,403 having a priority date of Dec. 30, 1999.

TECHNICAL FIELD OF THE INVENTION

This invention relates generally to the field of electronic film processing and more particularly to an improved system and method for digital film development using visible light.

BACKGROUND OF THE INVENTION

Images are used to communicate information and ideas. Images, including print pictures, film negatives, documents and the like, are often digitized to produce a digital image that can then be instantly communicated, viewed, enhanced, modified, printed or stored. The flexibility of digital images, as well as the ability to instantly communicate digital images, has led to a rising demand for improved systems and methods for film processing and the digitization of film based images into digital images. Film based images are traditionally digitized by electronically scanning a film negative or film positive that has been conventionally developed using a wet chemical developing process, as generally described below.

Undeveloped film generally includes a clear base and one or more emulsion layers containing a dye coupler and a photosensitive material, such as silver halide, that is sensitive to electromagnetic radiation, i.e., light. In color films, independent emulsion layers are sensitized to different bands, or colors, of light. In general, one or more emulsion layers are sensitized to light associated with the colors of red, green and blue. When a picture is taken, the photosensitive material is exposed to light from a scene and undergoes a chemical change. The greater the intensity of light interacting with the photosensitive material, the greater the chemical change in the photosensitive material. The photographic film can then be chemically processed to produce a fixed image of the scene based on this chemical change.

In a traditional wet chemical developing process, the film is immersed and agitated in a series of tanks containing different processing solutions. The first tank typically contains a developing solution. The developing solution chemically reacts with the exposed silver halide to produce elemental silver grains in each emulsion layer of the film. The metallic silver forms a silver image within each emulsion layer of the film. The by-product of the chemical reaction combines with the dye coupler in each emulsion layer to create a dye cloud. The color of the dye cloud is complementary to the band of light the emulsion layer has been sensitized to. For example, the red sensitized layer typically produces a cyan dye image, the green sensitized layer a magenta dye image, and the blue sensitized layer a yellow dye image. The density of the silver image and the corresponding dye image in each emulsion layer are directly proportional to the intensity of light the film was exposed to. The developing process is generally stopped by removing the film from the developer tank and rinsing the developing solution from the film with water or and acidic solution.

Conventional wet chemical developing processes remove both the silver image and the undeveloped silver halide grains from the film to produce a film negative having only a dye image within the film negative. To remove the silver image and undeveloped silver halide, the developed film is immersed and agitated in a tank of bleaching solution. The bleaching solution chemically oxidizes the metallic silver forming the silver image and converts the silver image into silver halide. The bleached film is then immersed and agitated in a tank of fixer solution. The fixer solution removes the silver halide from the film by substantially dissolving the silver halide crystals. The fixer solution is thereby contaminated with dissolved silver compounds and becomes a hazardous waste byproduct of the wet chemical developing process. The film is then washed, stabilized and dried to produce a conventional film negative. The film negative can then be used to produce a corresponding image on photographic paper by methods known to those skilled in the art.

Conventional film digitization processes scan the film negative using a conventional electronic scanner to produce a digital image that electronically represents the photographed image. Conventional electronic film scanners generally operate by directing white light through the film negative. The light interacts with the dye clouds forming the image and the intensity of the colors red, green and blue are recorded by a sensor. The sensor data is used to produce the digital image.

A relatively new process under development is digital film processing (DFP). DFP systems directly scan the film during the development process. In particular, instead of scanning the dye image in the film, conventional DFP systems scan the silver image formed in the emulsion layers while the film is developing. In conventional DFP systems, the film is scanned using infrared light. Scanning with infrared light prevents the film from being fogged and allows the developing film to be scanned at different times during the development process in order to acquire image data at different exposure levels.

The DFP scanning process is generally accomplished by measuring infrared light reflected from the developed silver image in the front and back emulsion layers, and measuring the infrared light transmitted through the film. The reflected and transmitted light measurements of the film provide data on the blue, red, and green sensitized emulsion layers, respectively. The measured reflected and transmitted light data is processed to produce the digital image.

SUMMARY OF THE INVENTION

One embodiment of the invention is an improved digital film processing system. In this embodiment, the improved digital film processing system includes a scanning system and a data processing system. The scanning system scans film and produces sensor data that is communicated to the data processing system. The film scanned by the scanning system includes silver and at least one dye cloud disposed within the film. The silver contained within the film may comprise developed metallic silver, silver halide, or both. The data processing system processes the sensor data to produce a full color digital image. The digital image can be output to any suitable output device, such as a monitor, printer, memory device, and/or the Internet. In a particular embodiment, the digital color film processing system is embodied as a self-service kiosk for processing film.

Another embodiment of the invention is a system for developing and processing film to produce a digital image. In this embodiment, the system includes a film processing system, a scanning system, and a data processing system. The film processing system operates to coat a processing solution onto the film that initiates development of a silver image and at least one dye cloud within the film. In a particular embodiment, the film processing system includes a halt station that operates to retard development of the coated film after the film has been developed for a predetermined amount of time. The halt station may operate by applying a halt solution to the coated film, chilling the film, drying the film, or any other suitable method for slowing the development of the film prior to scanning the film. The scanning system scans at least one of the dye images (cyan, magenta, yellow) within the coated film and outputs sensor data to the data processing system. The scanning system scans the coated film using at least one frequency of light within the visible portion of the electromagnetic spectrum. The data processing system receives and processes the sensor data to produce the digital image. The light used to scan the film may comprise blue light, red light, green light, any combination thereof, and any other suitable light, including infrared light. The scanning system may also operate to scan the film by measuring light transmitted through the film, reflected from the film, reflected and transmitted through the film, or any other suitable combination.

Another embodiment of the invention is a system for digitizing a developed film coated with a processing solution. In this embodiment, the system comprises at least one lighting system and at least one sensor system. The lighting system operates to illuminate the coated film with visible light. The sensor system operates to measure the light from the coated film and produce sensor data. In particular embodiments, the visible light includes blue light, green light, red light, or a suitable combination thereof. In yet another particular embodiment, the lighting system also operates to illuminate the film with infrared light.

Yet another embodiment of the invention is a film processing system. In this embodiment, the film processing system comprises an applicator station and a development station. The applicator station operates to coat a processing solution onto the film, wherein the processing solution initiates development of a silver image and at least one dye image within the film. The development station operates to substantially control the environment surrounding the coated film during development of the film. The film processing system may also include a halt station that operates to retard the development of the film after development of the film. In a particular embodiment, the halt station applies a halt solution to the film. The halt solution may comprise a fixer solution, bleach solution, stop solution, blix (bleach plus fixer) solution, any combination thereof, or any other suitable solution.

One implementation of the invention is a method for developing and digitizing exposed film having multiple emulsion layers containing silver halide. In this implementation, the method comprises coating a processing solution on the film to develop the exposed silver halide grains and produce at least one dye image within the coated film. The coated film is then scanned with light within the visible portion of the electromagnetic spectrum to produce a dye-silver record that is output as sensor data. The sensor data is then processed to produce a digital image. In a particular implementation, processing the sensor data includes processing the dye-silver record using a silver record to substantially remove the effects of silver within the film.

Another embodiment of the invention is the production of digital images produced by digitally processing film that has a silver image and at least one dye image within the film. Digitally processing the film comprises scanning the film with light having at least one frequency within the visible light portion of the electromagnetic spectrum and processing the scan data to produce the digital images. In a particular embodiment, the light used to scan the film comprises red, green, and infrared light. In other embodiments, the film is scanned using light transmitted through the film, reflected from the film, reflected and transmitted through the film, or any other suitable combination.

The invention has several important technical advantages. Various embodiments of the invention may have none, some, or all of these advantages. An advantage of at least one embodiment is that environmentally hazardous effluents are not created by the removal of silver from the film. In particular, no water plumbing is required to process the film in accordance with at least one embodiment of the invention. As a result, this embodiment is less expensive that conventional wet chemical processing systems and can be located at any location. In contrast, conventional wet chemical processing of film requires water plumbing and removes the silver from the film, which produces environmentally hazardous effluents that are controlled by many government regulatory agencies.

Another advantage of at least one embodiment of the invention is that the invention can be embodied in a simple user operated film processing system, such as a self-service kiosk. In this embodiment, skilled technicians are not required, thereby reducing the cost associated with developing and processing film. In addition, at least one embodiment of the invention allows the film to be developed and processed faster than conventional wet chemical processing of the film.

Another advantage of at least one embodiment of the invention is that data corresponding to the dye clouds in the film is used to produce the digital image. In other embodiments, data corresponding to the silver image in the film is also used to produce the digital image. In contrast, conventional digital film processing generally uses infrared light to collect data corresponding only to the silver to produce a digital image. Accordingly, at least one embodiment produces a better digital image than produced by conventional digital film processing.

Other technical advantages will be readily apparent to one skilled in the art from the following figures, descriptions, and claims.

BRIEF DESCRIPTION OF THE DRAWINGS

For a more complete understanding of the invention and the advantages thereof, reference is now made to the following description taken in conjunction with the accompanying drawings, wherein like reference numerals represent like parts, in which:

FIG. 2A is a schematic diagram illustrating a development system as shown in FIG. 1;

FIGS. 2B-1 through 2B-4 are schematic diagrams illustrating various embodiments of a halt station shown in FIG. 2B;

FIG. 3 is a schematic diagram illustrating a scanning system shown in FIG. 1;

FIGS. 5A–5B are flow charts illustrating various methods of improved digital film development in accordance with the invention.

DETAILED DESCRIPTION OF THE INVENTION

FIGS. 1 through 5B illustrate various embodiments of an improved method and system for digital film processing system using visible light. During the film development process, each exposed frame of film produces a silver image and a corresponding dye image. As described in greater detail below, the digital color dye film processing system and method utilizes light within the visible portion of the electromagnetic spectrum to scan color dye image without washing the silver from the film. In certain embodiments, other frequencies of light, such as light in the infrared region of the electromagnetic spectrum, is utilized to scan at least one of the silver images. The scan data is then used to produce a digital image of the photographed scene. In a conventional photographic development process, the metallic silver and silver halide are removed from the film and the film is dried to produce a film negative. A conventional film scanner can then be used to scan the film negative to produce a digital image.

Figure 1:
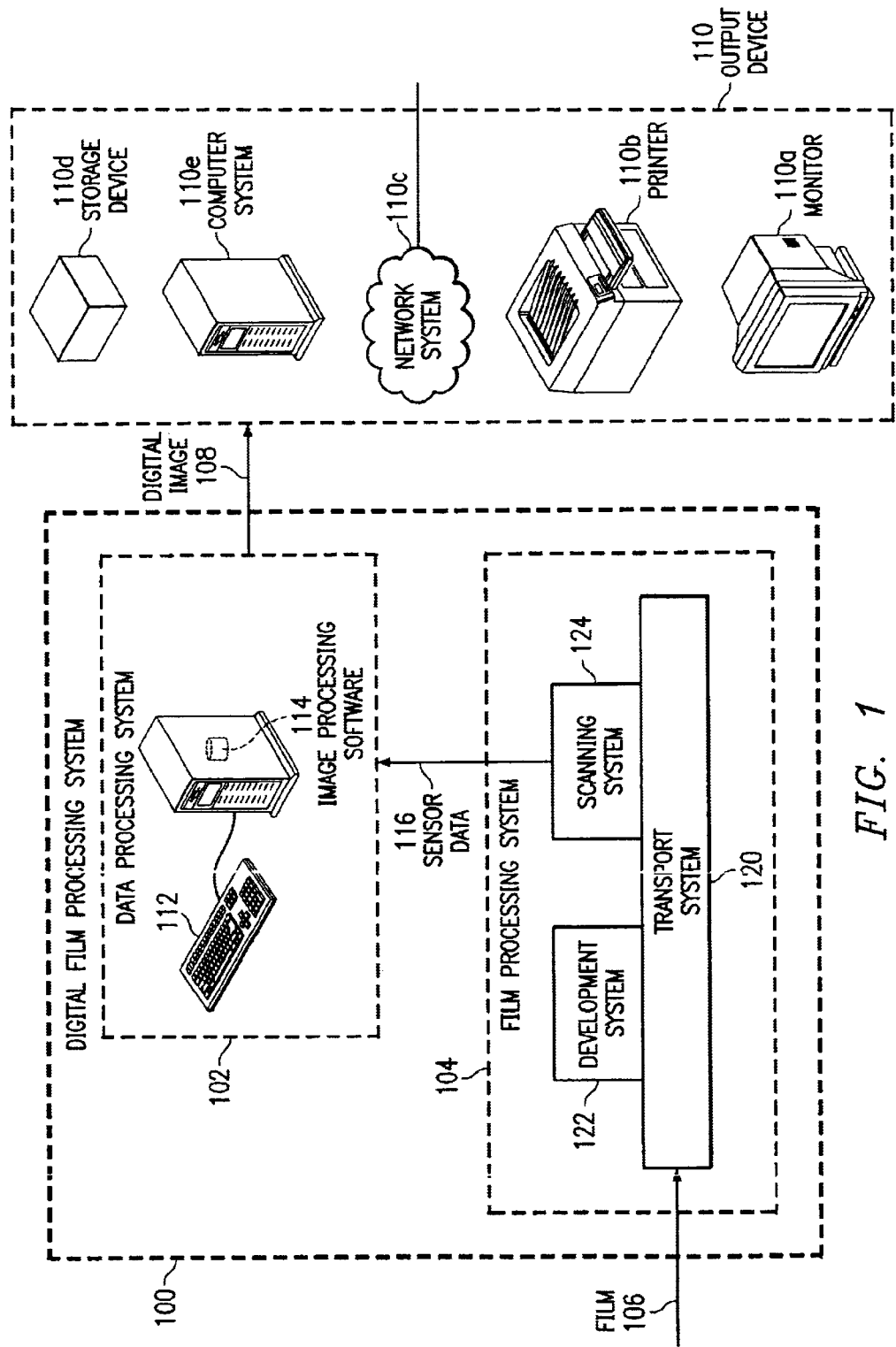
FIG. 1 is a schematic diagram of an improved digital film development system in accordance with the invention.

FIG. 1 is a diagram of an improved digital film development system 100 in accordance with one embodiment of the invention. In this embodiment, the system 100 comprises a data processing system 102 and a film processing system 104 that operates to digitize a film 106 to produce a digital image 108 that can be output to an output device 110. Film 106, as used herein, includes color, black and white, x-ray, infrared or any other type of film and is not meant to refer to any specific type of film or a specific manufacturer.

Data processing system 102 comprises any type of computer or processor operable to process data. For example, data processing system 102 may comprise a personal computer manufactured by Apple Computing, Inc. of Cupertino, Calif. or International Business Machines of New York. Data processing system 102 may also comprise any number of computers or individual processors, such as application specific integrated circuits (ASICs). Data processing system 102 may include an input device 112 operable to allow a user to input information into the system 100. Although input device 112 is illustrated as a keyboard, input device 112 may comprise any input device, such as a keypad, mouse, point-of-sale device, voice recognition system, memory reading device such as a flash card reader, or any other suitable data input device.

Data processing system 102 includes image processing software 114 resident on the data processing system 102.

Data processing system 102 receives sensor data 116 from film processing system 104. As described in greater detail below, sensor data 116 is representative of the colors and silver in the film 106 at each discrete location, or pixel, of the film 106. The sensor data 116 is processed by image processing software 114 to produce the digital image 108. The image processing software 114 operates to compensate for the silver in the film 106. In one embodiment, image processing software 114 comprises software based on U.S. patent application Ser. No. 08/999,421, entitled Defect Channel Nulling, which is incorporated herein by reference. In this embodiment, any silver remaining in the film 106 is treated as a defect and each individual pixel color record is compensated to remove the effect of the silver. Digitally compensating for the silver in the film 106 instead of chemically removing the silver from film 106 substantially reduces or eliminates the production of hazardous chemical effluents that are generally produced during conventional film processing methods. Although the image processing software 114 is described in terms of actual software, the image processing software 114 may be embodied as hardware, such as an ASIC. The color records for each pixel form the digital image 108; which is then communicated to one or more output devices 110.

Output device 110 may comprise any type or combination of suitable devices for displaying, storing, printing, transmitting or otherwise outputting the digital image 108. For example, as illustrated, output device 110 may comprise a monitor 110a, a printer 110b, a network system 110c, a mass storage device 110d, a computer system 110e, or any other suitable output device. Network system 118c may be any network system, such as the Internet, a local area network, and the like. Mass storage device 110d may be a magnetic or optical storage device, such as a floppy drive, hard drive, removable hard drive, optical drive, CD-ROM drive, and the like. Computer system 110e may be used to further process or enhance the digital image 108.

As described in greater detail below, film processing system 104 operates electronically scan the film 106 to produce the sensor data 116. Light used to scan the film 106 includes light within the visible portion of the electromagnetic spectrum. As illustrated, film processing system 104 comprises a transport system 120, a development system 122, and a scanning system 124. Although the system 100 is illustrated with a development system 122, alternative embodiments of the system 100 do not require the development system 122. For example, film 106 may have been preprocessed and not require the development process described below.

Transport system 120 operates to dispense and move the film 106 through the film processing system 104. In a preferred embodiment, the transport system 120 comprises a leader transport system in which a leader is spliced to the film 106 and a series of rollers advances the film 106 through the film processing system 104, with care taken that the image surface of the film 106 is not contacted. Similar transport systems 120 are found in film products manufactured by, for example, Noritsu Koki Co. of Wakayama, Japan, and are available to those in the art.

Figures 1, 2B:
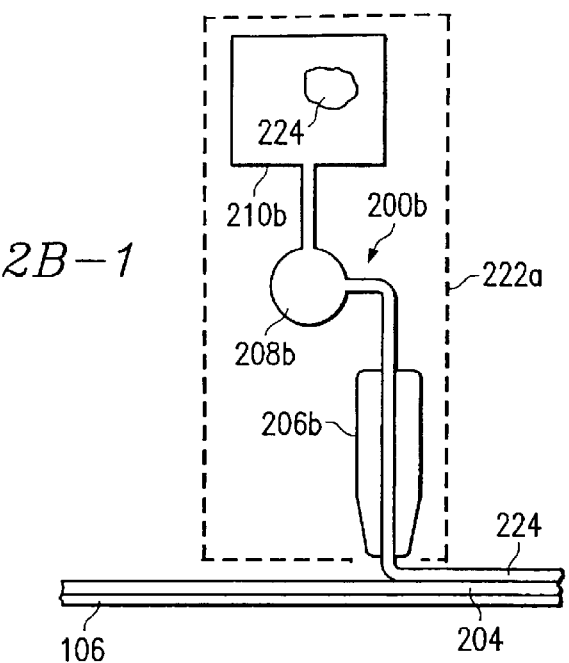
FIG. 2B is a schematic diagram illustrating another embodiment of the development system shown in FIG. 1.
Figures 2, 2B:
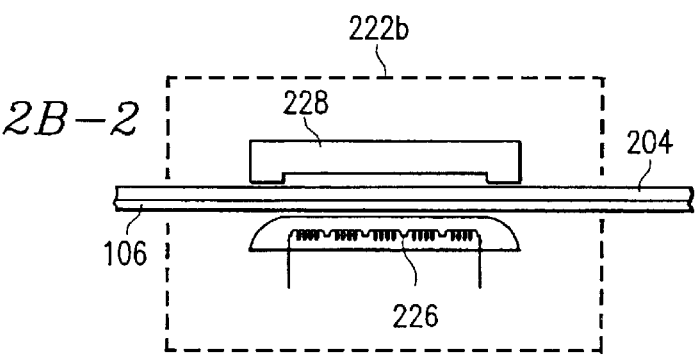

The development system 122 operates to apply a processing solution to the film 106, as described in greater detail in FIG. 2. The processing solution initiates development of the dye clouds and the metallic silver grains within the film 106. Additional processing solutions may also be applied to the film 106. For example, stop solutions, inhibitors, accelerators, bleach solutions, fixer solutions, and the like, may be applied to the film 106.

Figures 2, 2B, 3:
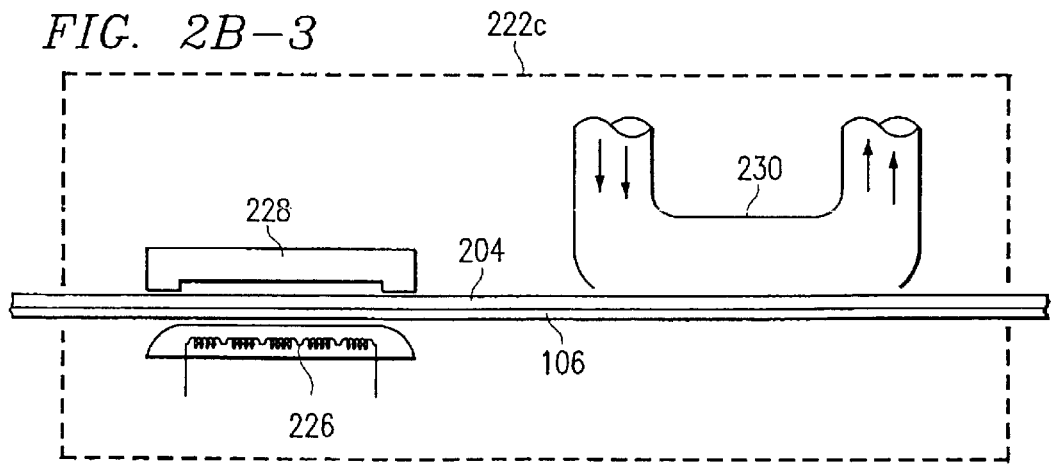

The scanning system 124 scans the film 106 through the processing solutions applied to the film 106, as described in greater detail in FIG. 3. In other words, the processing solutions are not removed from the film 106 prior to the scanning process. In contrast, conventional film processing systems remove the processing solution and dry the film to create a conventional film negative prior to any digitization process. The scanning station 124 scans the film 106 using light within the visible portion of the electromagnetic spectrum. The visible light measures the intensity associated with the dye clouds as well as the silver within the film 106. In particular, one or more bands of visible light may be used to scan the film 106. For example, the film 106 may be scanned using visible light within the red, green and/or blue portions of the electromagnetic radiation spectrum. In addition to scanning the film 106 using visible light, the scanning system 124 may also scan the film 106 using light from other portions of the electromagnetic spectrum. For example, in one embodiment, infrared light is also used to scan the film 106. The infrared light scans the silver image by measuring the density of the metallic silver grains within the film 106. In contrast, conventional film processing systems remove substantially all the silver, both silver halide and metallic silver, from the film 106 prior to any conventional scanning processes. Silver, whether metallic silver or silver halide crystals, in the film negative interferes with the transmission of light through the film negative and would be digitized along with the image. Any silver in the film negative would appear as defects in the resulting digital image.

In operation, exposed, but undeveloped film 106 is fed into the transport system 120. The film 106 is transported through the development system 122. The development system 122 applies a processing solution to the film 106 that develops the film 106. The transport system 120 moves the film 106 through the scanning system 124. The scanning system 124 scans the film 106 using light within at least one portion of the visible light portion of the electromagnetic spectrum. Light from the film 106 is measured by the sensor system, which produces sensor data 116. The sensor data 116 represents the dyes images plus the silver in the film 106 at each pixel. The sensor data 116 is communicated to data processing system 102. The data processing system 102 processes the sensor data 116 using image processing software 114 to produce the digital image 108. The data processing system 102 may also operate to enhance or otherwise modify the digital image 108. The data processing system 102 communicates the digital image 108 to the output device 110 for viewing, storage, printing, communicating, or any combination of the above.

In a particular embodiment of the improved digital film development system 100 the system 100 is adapted to a self service film processing system, such as a kiosk. Such a self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location. In other embodiments, the system 100 may be used for commercial film lab processing applications. Again, because there is no plumbing and the environmental impact of processing the film 106 is substantially reduced or eliminated, the installation cost and the legal liability for operating such a film lab is reduced. The system 100 can be adapted to any suitable application without departing from the scope and spirit of the invention.

FIG. 2A illustrates one embodiment of a development system 122. In this embodiment, a development system 122a comprises an applicator station 200 and a development station 202. The applicator station 200 operates to apply a relatively uniform coating of a processing solution 204 to the film 106. In one embodiment, the processing solution 204 comprises a color developer solution, such as Flexicolor Developer for Process C-41 available from the Eastman Kodak Company. In other embodiments, the processing solution 204 comprises other suitable solutions. For example, the processing solution 204 may comprise a monobath solution that acts as a developer and stop solution.

The applicator station 200 comprises an applicator 206, a fluid delivery system 208, and a reservoir 210. The applicator 206 operates to coat the film 106 with the processing solution 204. In the preferred embodiment, as illustrated, the applicator 206 comprises a slot coater device. In alternative embodiments, the applicator 206 comprises an ink jet applicator, a tank, an aerosol applicator, drip applicator, sponge applicator, or any other suitable device for applying the processing solution 204 to the film 106. The fluid delivery system 208 delivers the processing solution 204 from the reservoir 210 to the applicator 206. In an embodiment in which the applicator 206 comprises a slot coater device, the fluid delivery system 208 generally delivers the processing solution 204 at a constant volumetric flow rate to help insure uniformity of coating of processing solution 204 on the film 106. The reservoir 210 contains a sufficient volume of processing solution 204 to process multiple rolls of film 106. In the preferred embodiment, the reservoir 210 comprises a replaceable cartridge. In other embodiments, the reservoir 210 comprises a refillable tank. The applicator station 200 may comprise other suitable systems and devices for applying the processing solution 204 to the film 106.

The development station 202 operates to give the film 106 time to develop prior to being scanned by the scanning system 124. In the embodiment illustrated, the development station 202 forms that portion of the transport system 120 between the applicator 206 and the scanning system 124. The length of the development station 202 is generally dependent upon the development time of the film 106. In particular, depending upon the environment and chemical nature of the processing solution 204, development of the film 106 may require as little as a few seconds to as long as several minutes.

As illustrated, the development station 202 comprises a cover 212 that protects the film 106 during development. The cover 212 forms an environmental chamber 214 surrounding the film 106. The temperature and humidity within the environmental chamber 214 are strictly controlled. To facilitate controlling the temperature and humidity, the environmental chamber 214 has a minimum volume surrounding the film 106. The cover 212 may be insulated to maintain a substantially constant temperature as the film 106 is developed. In order to maintain the temperature, the development station 202 preferably includes a heating system 216. As illustrated, the heating system 216 may include a heated roller 218 and heating element 220. In addition, the heating system 216 may include a processing solution heating system (not expressly shown) that heats the processing solution 204 prior to its application to the film 106.

In operation, transport system 120 transports the film 106 through the applicator station 200. Fluid delivery system 208 dispenses the processing solution 204 from the reservoir 210 through the applicator 206 onto the film 106. The processing solution 204 initiates development of the dye image and silver image within the film 106. The coated film 106 is then transported through the development station 202. As discussed above, the development station 202 allows the film 106 time to develop within a controlled environment. The film 106 is then transported by the transport system 120 to the scanning system 124. As described above, the processing solution 204 coated on the film 106 is not removed, but remains on the film 106 as the film 106 is transported to the scanning system 124.

Figures 2, 2B, 3, 4:
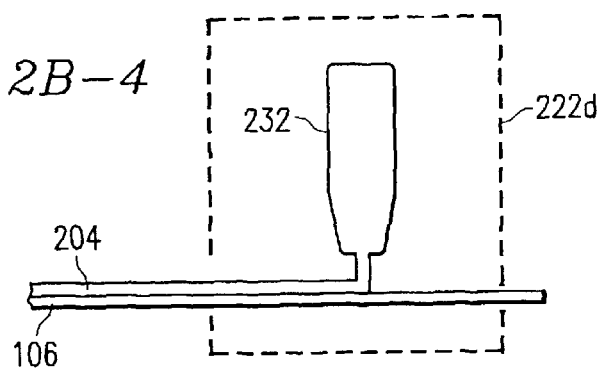

FIG. 2B illustrates an alternative development system 122b. In this embodiment, the development system 122b comprises an applicator station 200, a development station 202, and a halt station 222. The developer applicator station 200 and the development station 202 were previously discussed in FIG. 2A. The applicator station 200 again applies the processing solution 204 to the film 106 that initiates development of the silver image and dye image within the film 106. Halt station 222 operates to retard or substantially stop the continued development of the film 106. Retarding or substantially stopping the continued development of the film 106 increases the amount of time the film 106 can be exposed to visible light without substantially fogging of the film 106. FIGS. 2B-1–2B4 illustrate different examples of the halt station 222.

FIG. 2B-1 illustrates a halt station 222a that operates to apply at least one halt solution 224 to the film 106 coated with processing solution 204. The halt solution 224 retards or substantially stops the continued development of the film 106. In the embodiment illustrated, the halt station 222a comprises an applicator 206b, a fluid delivery system 208b, and a reservoir 210b, similar in function and design as described in FIG. 2A. Although a single applicator 206b, fluid delivery system 208b, and reservoir 210b are illustrated, the halt station 222a may comprise any number of applicators 206b, fluid delivery systems 208b, and reservoirs 210b that apply other suitable halt solutions 224 and other suitable solutions.

In one embodiment, the halt solution 224 comprises a bleach solution. In this embodiment, the bleach solution substantially oxidizes the metallic silver grains forming the silver image into a silver compound, which may improve the transmission of light through the film 106 during the scanning operation. In another embodiment, the halt solution 224 comprises a fixer solution. In this embodiment, the fixer solution substantially dissolves the silver halide, which can also improve the transmission of light through the film 106. In yet another embodiment, multiple halt solutions 224 are applied to the film 106. For example, a fixer solution can be applied to the film 106 and then a stabilizer solution can be applied to the film 106. In this example, the addition of the stabilizer desensitizes the silver halide within the film 106 and may allow the film 106 to be stored for long periods of time without sensitivity to light. The halt solution 224 may comprise any other suitable processing solution. For example, the halt solution 224 may comprise an aqueous solution, a blix solution (mixture of bleach and fix solutions), a stop solution, or any other suitable solution or combination of processing solutions for retarding or substantially stopping the continued development of the film 106.

FIG. 2B-2 illustrates a halt station 222b that operates to chill the developing film 106. Chilling the developing film 106 substantially slows the chemical developing action of the processing solution 204. In the embodiment illustrated, the chill station 222b comprises an electrical cooling plate 226 and insulation shield 228. In this embodiment, the cooling plate 226 is electronically maintained at a cool temperature that substantially arrests the chemical reaction of the processing solution 204. The insulation shield 228 substantially reduces the heat transfer to the cooling plate 226. The chill halt station 222b may comprise any other suitable system and device for chilling the developing film 106.

FIG. 2B-3 illustrates a halt station 222c that operates to dry the processing solution 204 on the coated film 106. Drying the processing solution 204 substantially stops further development of the film 106. In the embodiment illustrated, the halt station 222c comprises an optional cooling plate 226, as described in FIG. 2B-2, and a drying system 230. Although heating the coated film 106 would facilitate drying the processing solution 204, the higher temperature would also have the effect of accelerating the chemical reaction of the processing solution 204 and film 106. Accordingly, in the preferred embodiment, the film 106 is cooled to retard the chemical action of the processing solution 204 and then dried to effectively freeze-dry the coated film 106. Although chilling the film 106 is preferred, heating the film 106 to dry the film 106 can also be accomplished by incorporating the accelerated action of the developer solution 204 into the development time for the film 106. In another embodiment in which a suitable halt solution 224 is applied to the film 106, the chemical action of the processing solution 204 is already minimized and the film 106 can be dried using heat without substantially effecting the development of the film 106. As illustrated, the drying system 230 circulates air over the film 106 to dry the processing solution 204 and depending upon the embodiment, the halt solution 224. The halt station 222c may comprise any other suitable system for drying the film 106.

FIG. 2B-4 illustrates a halt station 222d that operates to substantially remove excess processing solution 204, and any excess halt solution 224, from the film 106. The halt station 222d does not remove the solutions 204, 224 that are absorbed into the film 106. In other words, even after the wiping action, the film 106 includes some solution 204, 224. Removing any excess processing solution 204 will retard the continued development of the film 106. In addition, wiping any excess solutions 204, 224 from the film 106 may improve the light reflectance and transmissivity properties of the coated film 106. In particular, removal of the excess solutions 204, 224 may reduce any surface irregularities in the coating surface, which can degrade the scanning operations described in detail in FIGS. 3 and 4. In the embodiment illustrated, the halt station 222d comprises a wiper 232 operable to substantially remove excess processing solution 204 and any halt solution 224. In a particular embodiment, the wiper 232 includes an absorbent material that wicks away the excess solutions 204, 224. In another embodiment, the wiper 232 comprises a squeegee that mechanically removes substantially all the excess solutions 204, 224. The halt station 222d may comprise any suitable device or system operable to substantially remove any excess solutions 204, 224.

Although specific embodiments of the halt station 222 have been described above, the halt station 222 may comprise any suitable device or system for retarding or substantially stopping the continued development of the film 106. In particular, the halt station 222 may comprise any suitable combination of the above embodiments. For example, the halt station 222 may comprise an applicator station 200b for applying a halt solution 224, a cooling plate 226, and a drying system 230. As another example, the halt station 222 may comprise a wiper 232 and a drying system 230.

FIG. 3 is a diagram of the scanning system 124. Scanning system 124 comprises one or more scanning stations 300. Individual scanning stations 300 may have the same or different architectures and embodiments. Each scanning station 300 comprises a lighting system 302 and a sensor system 304. The lighting system 302 includes one or more light sources 306 and optional optics 308. The sensor system 304 includes one or more detectors 310 and optional optics 312. In operation, the lighting system 302 operates to produce suitable light 320 that is directed onto the film 106. The sensor system 304 operates to measure the light 320 from the film 106 and produce sensor data 116 that is communicated to the to the data processing system 102.

Each scanning station 300 utilizes electromagnetic radiation, i.e., light, to scan the film 106. Individual scanning stations 300 may have different architectures and scan the film 106 using different colors, or frequency bands (wavelengths), and color combinations. In particular, different colors of light interact differently with the film 106. Visible light interacts with the dye image and silver within the film 106. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 300 may utilize other suitable colors and wavelengths (frequency) ranges without departing from the spirit and scope of the invention.

The light source 306 may comprise one or more devices or a system that produces suitable light 320. In the preferred embodiment, the light source 306, comprises an array of light-emitting diodes (LEDs). In this embodiment, different LEDs within the array may be used to produce different colors of light 320, including infrared light. In particular, specific colors of LEDs can be controlled to produce short duration pulses of light 320. In another embodiment, the light source 306 comprises a broad spectrum light source 306, such as a fluorescent, incandescent, tungsten-halogen, direct gas discharge lamps, and the like. In this embodiment, the sensor system 304 may include filters for spectrally separating the colors of light 320 from the film 106. For example, as described below, a RGB filtered trilinear array of detectors may be used to spectrally separate the light 320 from the film 106. In another embodiment of a broad-spectrum light source, the light source 306 includes a filter, such as a color wheel, to produce the specified colors of light 320. In yet another embodiment, the light source 306 comprises a point light source, such as a laser. For example, the point light source may be a gallium arsenide or an indium gallium phosphide laser. In this embodiment, the width of the laser beam is preferably the same size as a pixel on the film 106 (~12 microns). Filters, such as a color wheel, or other suitable wavelength modifiers or limiters maybe used to provide the specified color or colors of light 320.

Optional optics 308 for the lighting system 302 directs the light 320 to the film 106. In the preferred embodiment, the optics 308 comprises a waveguide that directs the light 320 onto the film 106. In other embodiment, the optics 320 includes a lens system for focusing the light 320. In a particular embodiment, the lens system includes a polarizing filter to condition the light 320. The optics 308 may also include a light baffle 322a. The light baffle 322a constrains illumination of the light 320 within a scan area in order to reduce light leakage that could cause fogging of the film 106. In one embodiment, the light baffle 322a comprises a coated member adjacent the film 106. The coating is generally a light absorbing material to prevent reflecting light 320 that could cause fogging of the film 106.

The detector 310 comprises one or more photodetectors that convert light 320 from the film 106 into data signals 116. In the preferred embodiment, the detector 310 comprises a linear charge coupled device (CCD) array. In another embodiment, the detector 310 comprises an area array. The detector 310 may also comprise a photodiode, phototransistor, photoresistor, and the like. The detector 310 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 320. Other suitable types of filters may be used. For example, a hot mirror and a cold mirror can be used to separate infrared light from visible light.

Optional optics 312 for the sensor system 304 directs the light 320 from the film 106 onto the detector 310. In the preferred embodiment, the optics 312 comprises a lens system that directs the light 320 from the film 106 onto the detector 310. In a particular embodiment, the optics 312 include polarized lenses. The optics 312 may also include a light baffle 322b. The light baffle 322b is similar in function to light baffle 322a to help prevent fogging of the film 106.

As discussed previously, individual scanning stations 300 may have different architectures. For example, light 320 sensed by the sensor system 304 may be transmitted light or reflected light. Light 320 reflected from the film 106 is generally representative of the emulsion layer on the same side of the film 106 as the sensor system 304. Specifically, light 320 reflected from the front side (emulsion side) of the film 106 represents the blue sensitive layer and light 320 reflected from the back side of the film 106 represents the red sensitive layer. Light 320 transmitted through the film 106 collects information from all layers of the film 106. Different colors of light 320 are used to measure different characteristics of the film 106. For example, visible light interacts with the dye image and silver within the film 106, and infrared light interacts with the silver in the film 106.

Different architectures and embodiments of the scanning station 300 may scan the film 106 differently. In particular, the lighting system 302 and sensor system 304 operate in concert to illuminate and sense the light 320 from the film 106 to produce suitable sensor data 116. In one embodiment, the lighting system 302 separately applies distinct colors of light 320 to the film 106. In this embodiment, the sensor system 304 generally comprises a non-filtered detector 310 that measures in series the corresponding colors of light 320 from the film 106. In another embodiment, multiple unique color combinations are simultaneously applied to the film 106, and individual color records are derived from the sensor data 116. In another embodiment, the lighting system 302 simultaneously applies multiple colors of light 320 to the film 106. In this embodiment, the sensor system 304 generally comprises a filtered detector 310 that allows the simultaneous measurement of individual colors of light 320. Other suitable scanning methods may be used to obtain the required color records.

The use of the halt station 222 may improve the scanning properties of the film 106 in addition to retarding or substantially stopping the continued development of the film 106. For example, the intensity of light 320 transmitted through the film 106 may be partially blocked, or occluded, by the silver within the film 106. In particular, both the silver image and silver halide within the film 106 occlude light 320. On the whole, the silver image within the film 106 absorbs light 320, and the silver halide reflects light 320. The halt solutions 224 may be used to improve the scanning properties of the film 106. For example, applying a bleach solution to the film 106 reduces the optical density of the silver image within the film 106. Applying a fixer solution to the film 106 reduces optical density of silver halide within the film 106. Another method for improving the scanning properties of the film 106 is drying the film 106. Drying the film 106 improves the clarity of the film 106.

As described above, the scanning system 124 may include one or more individual scanning stations 300. Specific examples of scanner station 300 architectures are illustrated in FIGS. 4A–4D. The scanning system 124 may comprise any illustrated example, combination of examples, or other suitable methods or systems for scanning the film 106.

Figure 4A:
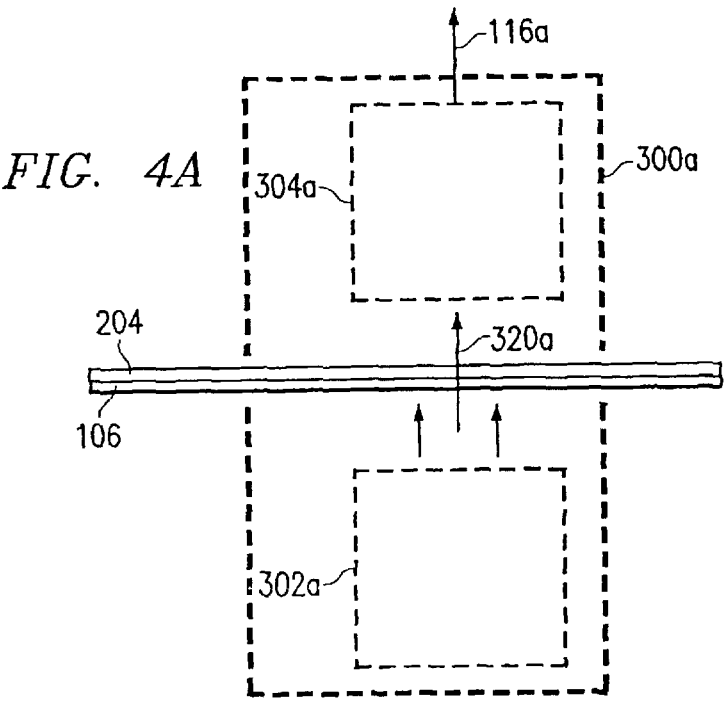
FIGS. 4A–4D are schematic diagrams illustrating various embodiments of a scanning station shown in FIG. 3.

FIG. 4A is a schematic diagram illustrating a scanning station 300a having a transmission architecture. As illustrated, the transmission scanning station 300a comprises a lighting system 302a and a sensor system 304a. Lighting system 302a produces light 320a that is transmitted through the film 106 and measured by the sensor system 304a. The sensor system 304a produces sensor data 116a that is communicated to the data processing system 102. Lighting system 302a and sensor system 304a are similar in design and function as lighting system 302 and sensor system 304, respectively. Although FIG. 4A illustrates the light 320a being transmitted through the film 106 from the backside to the frontside of the film 106, the light 320a can also be transmitted through the film 106 from the frontside to the backside of the film 106 without departing from the scope of the invention.

In one embodiment of the scanning station 300a, the light 320a produced by the lighting system 302a comprises visible light. The visible light 320a may comprise broadband visible light individual visible light colors, or combinations of visible light colors. The visible light 320a interacts with the silver and at least one dye cloud within the film 106. In particular, depending upon the embodiment of the development system 122, the silver remaining in the film 106 may be metallic silver, silver compound, or both.

In an embodiment in which the visible light 320a interacts with the magenta, cyan and yellow dye images within the film 106, as well as the silver within the film 106, the sensor system 304a records the intensity of visible light 320a from the film 106 and produces sensor data 116a. The sensor data 116a generally comprises a red, green, and blue record corresponding to the cyan, magenta, and yellow dye images, respectively. Each of the red, green, and blue records includes a silver record. As previously discussed, the silver partially occludes the visible light 320a being transmitted through the film 106. Accordingly, the red, green, and blue records are generally processed by the data processing system 102 to correct the records for the occlusion caused by the silver image in the film 106.

In the preferred embodiment of the transmission scanning station 300a, the light 320a produced by the lighting system 302a comprises visible light and infrared light. As discussed above, the visible light may comprise broadband visible light, individual visible light colors, or combinations of visible light colors. The infrared light may comprise infrared, near infrared, or any suitable combination. The visible light 320a interacts with the silver and at least one dye image, i.e. cyan, magenta, or yellow dye images, within the film 106 to produce a red, green, and/or blue record that includes a silver record. The infrared light interacts with the silver within the film 106 and produces a silver record. The silver image record can then be used to remove, at least in part, the silver metal record contained in the red, green, and blue records. This embodiment is analogous to the defect correction electronic scanners described in U.S. Pat. No. 5,266,805, entitled System and Method for Image Recovery, which is hereby incorporated herein by reference. In this embodiment, the silver is analogous to a defect that obstructs the optical path of the infrared light. The amount of occlusion is used as a basis for modifying the color records. For example, in pixels having a high silver density, the individual color records are significantly increased, whereas in pixels having a low silver density, the individual color records are relatively unchanged.

In yet another embodiment of the transmission scanning station 300a, the light produced by the lighting system 302a comprises infrared or near infrared light. In this embodiment, the infrared light 320a interacts with the silver image in the film 106 but does not substantially interact with the dye images within the film 106. In this embodiment, the sensor data 116a does not spectrally distinguish the magenta, cyan, and yellow dye images. An advantage of this embodiment is that the infrared light 320a does not fog the film 106. In a particular embodiment, the advantage of not fogging the film 106 allows the film 106 to be scanned at multiple development times without significantly fogging the film 106. In this embodiment, the scanning station 300a can be used to determine the optimal development time for the film 106. This embodiment may optimally be used to determine the optimal development time of the film 106, which can then be scanned using another scanning station 300

Figure 4B:
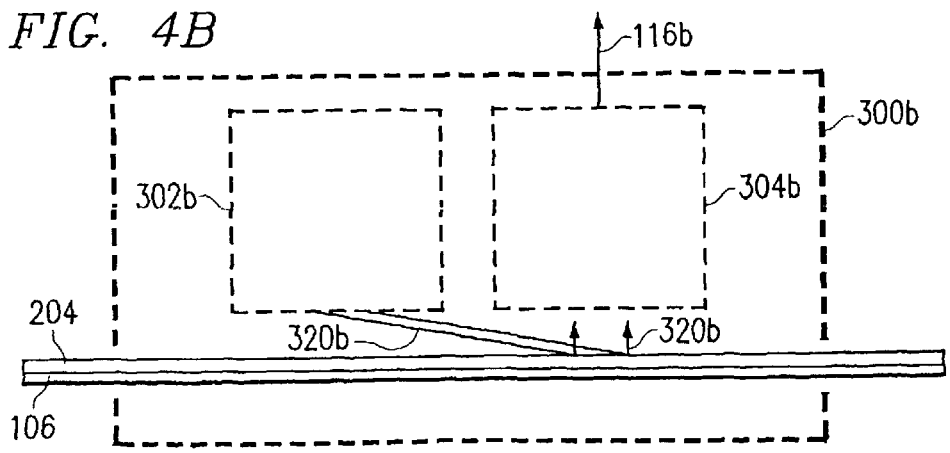
Figure 3:
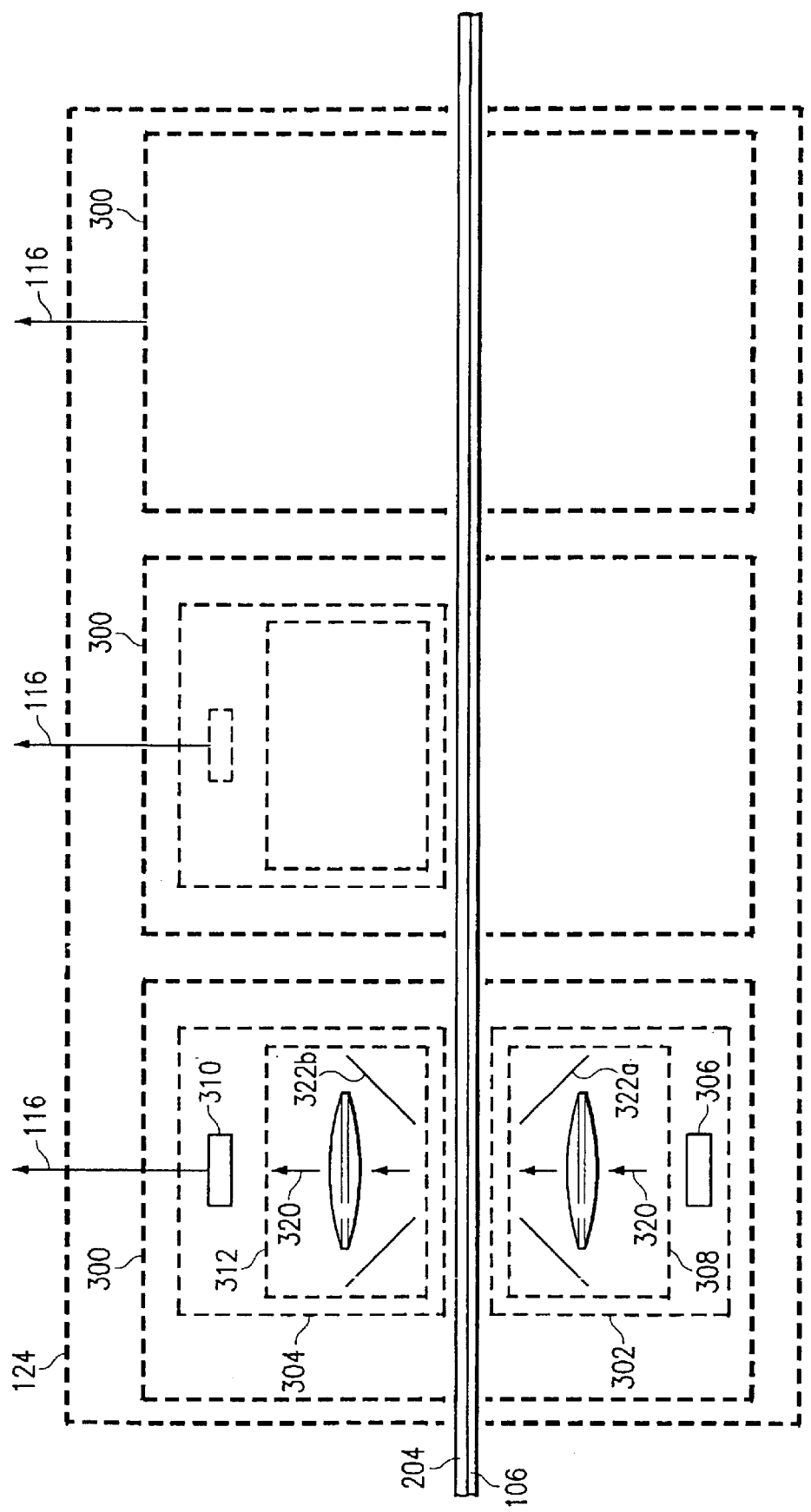

FIG. 4B is a schematic diagram illustrating a scanning station 300b having a reflection architecture. The reflective scanning station 300b comprises a lighting system 302b and a sensor system 304b. Lighting system 302b produces light 320b that is reflected from the film 106 and measured by the sensor system 304b. The sensor system 304b produces sensor data 116b that is communicated to the data processing system 102. Lighting system 302b and sensor system 304b are similar to lighting system 302 and sensor system 304, respectively.

In one embodiment of the reflective scanning station 300b used to scan the blue emulsion layer of the film 106, the light 320b produced by the lighting system 302b comprises blue light. In this embodiment, the blue light 320b scans the silver image and dye image within the blue layer of the film 106.

The blue light 320*b* interacts with the yellow dye image and also the silver in the blue emulsion layer. In particular, the blue light 320*b* is reflected from the silver halide and measured by the sensor system 304*b* to produce a blue record. Many conventional films 106 include a yellow filter below the blue emulsion layer that blocks the blue light 320*a* from illuminating the other emulsion layers of the film 106. As a result, noise created by cross-talk between the blue emulsion layer and the red and green emulsion layers is substantially reduced.

In another embodiment of the reflective scanning station 300*b* used to scan the blue emulsion layer of the, film 106, the light 320*b* produced by the lighting system 302*b* comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 106. In this embodiment, the non-blue light 320*b* interacts with the silver image in the blue emulsion layer of the film 106, but is transparent to the yellow dye within the blue emulsion layer of the film 106. This embodiment is prone to higher noise levels created by cross-talk between the blue and green emulsion layers of the film 106.

In yet another embodiment of the reflective scanning station 300*b*, the light 320*b* produced by the lighting system 302*b* comprises visible and infrared light. In this embodiment, blue light interacts with the yellow dye image and the silver image in the blue emulsion layer, green light interacts with magenta dye image and the silver image in each of the emulsion layers, red light interacts with the cyan dye image and the silver in each of the emulsion layers, and the infrared light interacts with the silver in each emulsion layer of the film 106. In this embodiment, the sensor system 304*b* generally comprises a filtered detector 310*b* (not expressly shown) that measures the red, green, blue, and infrared light 320*b* from the film 106 to produce red, green, blue, and infrared records as sensor data 116*b*.

Although the scanning station 300*b* is illustrated with the lighting system 302*b* and the sensor system 304*b* located on front side of the film 106, the lighting system 302*b* and the sensor system 304*b* may also be located on the back side of the film 106. In one embodiment, the light 320*b* produced by the lighting system 302*b* may comprise red light. The red light largely interacts with the cyan dye image and silver in the red emulsion layer of the film 106 to produce a red record of the sensor data 116*b*.

Figure 4C:
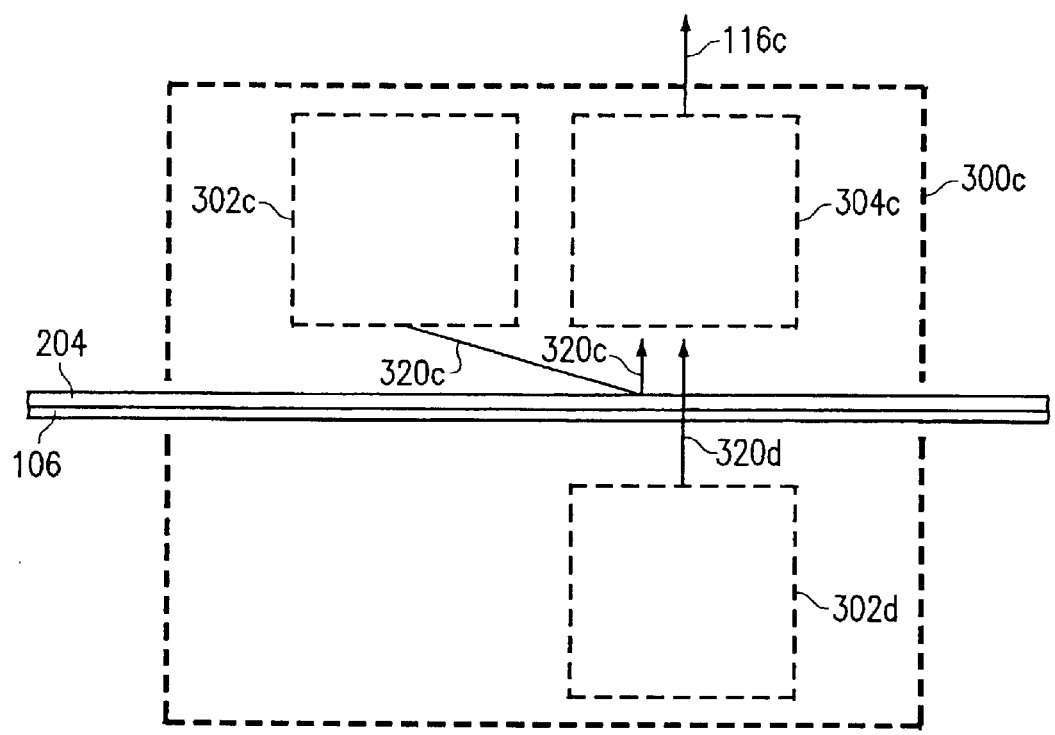

FIG. 4C is a schematic diagram illustrating a scanning station 300*c* having a transmission-reflection architecture. In this embodiment, the scanning station 300*c* comprises a first lighting system 302*c*, a second lighting system 302*d*, and a sensor system 304*c*. In the preferred embodiment, the lighting system 302*c* operates to illuminate the front side of the film 106 with light 320*c*, the second lighting system 302*d* operates to illuminate the backside of the film 106 with light 320*d*, and the sensor system 304*c* operates to measure the light 320*c* reflected from the film 106 and the light 320*d* transmitted through the film 106. Based on the measurements of the light 320*b*, 320*d*, the sensor system 304*c* produces sensor data 116*c* that is communicated to the data processing system 102. Lighting system 302*c* and 302*d* are similar to lighting system 302, and sensor system 304*c* is similar to the sensor system 304. Although scanning station 300*c* is illustrated with lighting systems 302*c*, 302*d*, a single light source may be used to produce light that is directed through a system of mirrors, shutters, filters, and the like, to illuminate the film 106 with the front side of the film 106 with light 320*c* and illuminate the back side of the film 106 with light 320*d*. The light 320*c*, 320*d* may comprise any color or color combinations, including infrared light.

This embodiment of the scanning station 300*c* utilizes many of the positive characteristics of the transmission architecture scanning station 300*a* and the reflection architecture scanning station 300*b*. For example, the blue emulsion layer is viewed better by light 320*c* reflected from the film 106 than by light 320*d* transmitted through the film 106; the green emulsion layer is viewed better by light 320*d* transmitted through the film 106 than by light 320*c* reflected from the film 106; and the red emulsion layer is adequately viewed by light 320*d* transmitted through the film 106. In addition, the cost of the scanning station 300*c* is minimized through the use of a single sensor system 304*c*.

In the preferred embodiment of the scanning station 300*c*, the light 320*c* comprises blue light, and light 320*d* comprises red, green, and infrared light. The blue light 320*c* interacts with the yellow dye image and silver in the blue emulsion layer of the film 106. The sensor system 304*c* measures the light 320*c* from the film 106 and produces a blue-silver record. The red and green light 320*d* interacts with the cyan and magenta dye images, respectively, as well as the silver in the film 106. The infrared light 320*d* interacts with the silver, but does not interact with the dye clouds within the film 106. As discussed previously, the silver contained within the film 106 may comprise silver grains, silver halide, or both. The red, green, and infrared light 320*d* transmitted through the film 106 is measured by the sensor system 304*c*, which produces a red-silver, green-silver, and silver record. The blue-silver, red-silver, green-silver, and silver records form the sensor data 116*c* that is communicated to the data processing system 102. The data processing system 102 utilizes the silver record to facilitate removal of the silver component from the red, green, and blue records.

In another embodiment, the light 320*c* comprises blue light and infrared light, and light 320*d* comprises red, green, and infrared light. As discussed previously, the blue light 320*c* mainly interacts with the yellow dye image and silver within the blue emulsion layer of the film 106. The infrared light 320*c* interacts with mainly the silver in the blue emulsion layer of the film 106. The sensor system 304*c* measures the blue and infrared light 320*c* from the film 106 and produces a blue-silver record and a front side silver record, respectively. The red, green, and infrared light 320*d* interact with the film 106 and are measured by the sensor system 304*c* to produce red-silver, green-silver and transmitted-silver records as discussed above. The blue-silver, red-silver, green-silver, and both silver records form the sensor data 116*c* that is communicated to the data processing system 102. In this embodiment, the data processing system 102 utilizes the front side silver record of the blue emulsion layer to facilitate removal of the silver component from the blue-silver record, and the transmission-silver record is utilized to facilitate removal of the silver component from the red and green records.

Although the scanning station 300*c* is described in terms of specific colors and color combinations of light 320*c* and light 320*d*, the light 320*c* and light 320*d* may comprise other suitable colors and color combinations of light without departing from the scope of the invention. For example light 320*c* may comprise non-blue light, infrared light, broadband white light, or any other suitable light. Likewise, light 320*d* may include blue light, broadband white light, or another other suitable light. Scanning station 300*c* may also comprise other suitable embodiments without departing from the scope of the invention. For example, although the scanning station 300c is illustrated with two lighting systems 302 and a single sensor system 304, the scanning station 300c could be configured with a single lighting system 302 and two sensor systems 304, wherein one sensor system measures light 320 reflected from the film 106 and the second sensory system 304 measures light 320 transmitted through the film 106. In addition, as discussed above, the scanning station 300 may comprise a single lighting system that illuminates the film 106 with light 320c and light 320d.

Figure 4D:
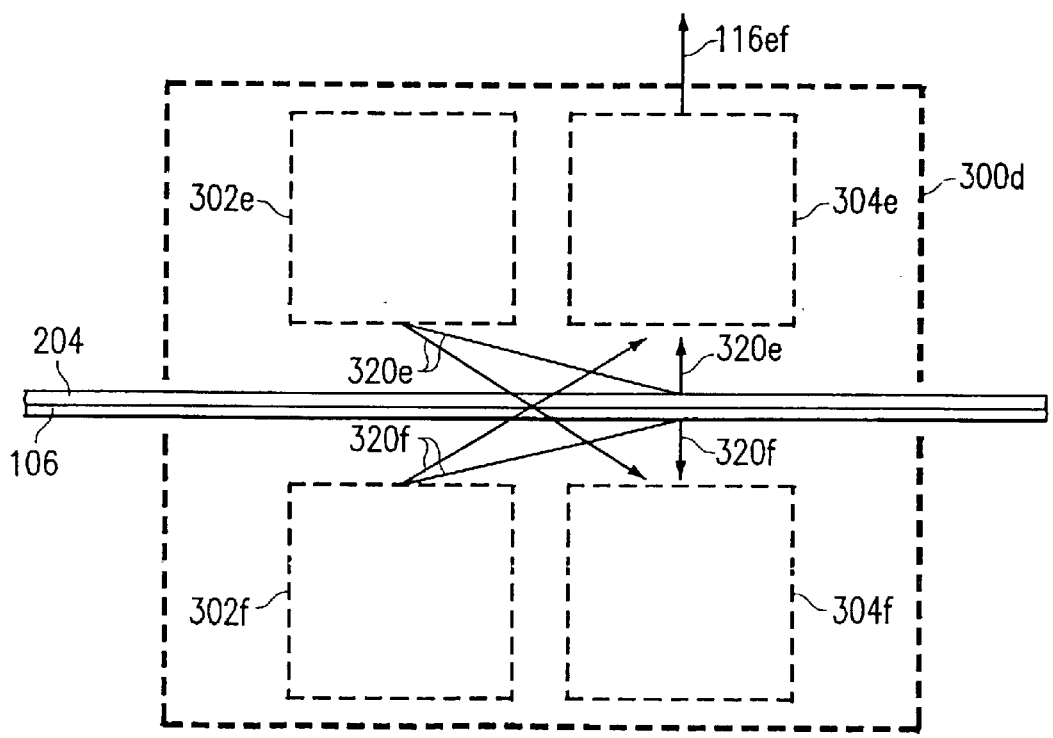

FIG. 4D is a schematic diagram illustrating a scanning station 300d having a reflection-transmission-reflection architecture. In this embodiment, the scanning station 300d comprises a first lighting system 302e, a second lighting system 302f, a first sensor system 304e, and a second sensor system 304f. In the embodiment illustrated, the lighting system 302e operates to illuminate the front side of the film 106 with light 320e, and the second lighting system 302f operates to illuminate the back side of the film 106 with light 320f. The first sensor system 304e operates to measure the light 320e reflected from the film 106 and the light 320f transmitted through the film 106, and the second sensor system 304f operates to measure the light 320f reflected from the film 106 and the light 320e transmitted through the film 106. Based on the measurements of the light 320e and 320f, the sensor systems 304e, 304f produce sensor data 116ef that is communicated to the data processing system 102. Lighting systems 302e, 302f are similar to lighting systems 302, and sensor systems 304e, 304f are similar to the sensor system 304. Although scanning station 300d is illustrated with lighting systems 302e, 302f, and sensor systems, 304e, 304f, a single lighting system and/or sensory system, respectively, may be used to produce light that is directed through a system of mirrors, shutters, filters, and the like, to illuminate the film 106 with the frontside of the film 106 with light 320e and illuminate the backside of the film 106 with light 320f.

This embodiment of the scanning station 300d expands upon the positive characteristics of the transmission-reflection architecture of scanning station 300c. For example, as discussed in reference to FIG. 4C, the blue emulsion layer is viewed better by light 320e reflected from the film 106 and the green emulsion layer is viewed better by light 320e or 320f transmitted through the film 106. Second sensor system 304f allows viewing of the red emulsion layer by light 320f reflected from the film 106, which generally produces better results than viewing the red emulsion layer by light 320e or light 320f transmitted through the film 106.

In the preferred embodiment of the scanning station 300d, the sensor systems 304e, 304f include a trilinear array of filtered detectors, and the light 320e and the light 320f comprises broadband white light and infrared light. The trilinear array operates to simultaneously measure the individual red, green, and blue components of the broadband white light 320e, 320f. The infrared light is measured separately and can be measured through each filtered detector 310 of the sensor systems 304e, 304f. The broadband white light 320e, 320f interacts with the silver and magenta, cyan, and yellow color dyes in the film 106, respectively, and the infrared light 320e, 320f interacts with the silver within the film 106. The reflected white light 320e measured by the first sensor system 304e includes information corresponding to the yellow dye image and the silver in the blue emulsion layer of the film 106. In particular, the blue component of the broadband white light 320e measured by the blue detector of the sensor system 304e corresponds to the yellow dye image, and the non-blue components of the broadband white light 320e measured by the red and green detectors corresponds to the red and green dye images and all the silver within the emulsion layers of the film 106. Similarly, the red component of the broadband white light 320f measured by the red detector of the sensor system 304f corresponds largely to the cyan dye image, and the non-red components of the broadband white light 320e measured by the blue and green detectors corresponds to the yellow and magenta dye images and all the silver within the emulsion layers of the film 106. The white light 320e, 320f transmitted through the film 106 interacts with each color dye image and silver within the film 106, and the red, green, and blue light components are measured by the red, green, and blue detectors of the sensor systems 304e, 304f to produce individual red, green and blue light records that include the silver record. The infrared light 320e reflected from the film 106 and measured by the sensor system 304e corresponds largely to the silver in the blue emulsion layer of the film 106, and the infrared light 320f reflected from the film 106 and measured by the sensor system 304f largely corresponds to the silver in the red emulsion layer of the film 106. The infrared light 320e, 320f transmitted through the film 106 measured by the sensor systems 304e, 304f corresponds to the silver in the red, green, and blue emulsion layers of the film 106. The individual measurements of the sensor systems 304e, 304f are communicated to the data processing system 102 as sensor data 116ef. The data processing system 102 processes the sensor data 116ef and constructs the digital image 108 using the various sensor system measurements. For example, the blue signal value for each pixel can be calculated using the blue detector data from the reflected light 320e and the blue detector data from the transmitted light 320f, as modified by non-blue detector data from the reflected light 320e, and the non-blue detector data from the transmitted light 320e or 320f. The red and green signal values for each pixel can be similarly calculated using the various measurements.

In another embodiment of the scanning station 300d, the sensor systems 304e, 304f include a trilinear array of filtered detectors, and the light 320e and the light 320f comprises broadband white light. This embodiment of the scanning station 300d operates in a similar manner as discussed above, with the exception that infrared light is not measured or used to calculate the digital image 108. Although the scanning station 300d is described in terms of a specific colors and color combinations of light 320e and light 320f, the light 320e and light 320f may comprise other suitable colors and color combinations of light without departing from the scope of the invention. Likewise, the scanning station 300d may comprise other suitable devices and systems without departing from the scope of the invention.

FIG. 5A is a flowchart of one embodiment of a method for developing and processing film. This method may be used in conjunction with one or more embodiments of the system 100 that includes a data processing system 102 and a film processing system 104 having a transport system 120, a development system 122, and a scanning system 124. The development system 122 includes an applicator station 200 for applying a processing solution 204 to the film 106 and a development station 202. The scanning system 124 comprises a single scanning station 300 operable to scan the film 106 with light 320 having a frequency (wavelength) within the visible light spectrum and produce sensor data 116 that is communicated to the data processing system 102. The data processing system 102 processes the sensor data 116 to produce a digital image 108 that may be output to an output device 110.

The method begins at step 500, where the transport system 120 advances the film 106 to the applicator station 200. Film 106 is generally fed from a conventional film cartridge and advanced by the transport system 120 through the various stations of the film processing system 104. At step 502, processing solution 204 is applied to the film 106. The processing solution 204 initiates production of silver and at least one dye image within the film 106. The processing solution 204 is generally applied as a thin coating onto the film 106, which is absorbed by the film 106. At step 504, the film 106 is advanced through the development station 202 where the dye images and silver grains develop within the film 106. The environmental conditions, such as the temperature and humidity, are generally controlled within development station 202. This allows the film 106 to develop in a controlled and repeatable manner and provides the proper development time for the film 106. At step 506, the film 106 is scanned by the scanning system 124 using light 320 having at least one frequency within the visible portion of the electromagnetic spectrum, i.e., visible light. The visible light interacts with at least one dye image within the film 106 and also the silver within the film 106. In some embodiments, the light 320 used to scan the film 106 also includes infrared light. Infrared light interacts with the silver, but is substantially unaffected by the dye images within the film 106. As discussed in reference to FIGS. 4A–4D, the film 106 can be scanned in a number of different ways embodied in a number of different architectures, each with their own advantages. Sensor data 116 is produced by the scanning system 124 and communicated to the data processing system 102. At step 508, the sensor data 116 is processed to produce the digital image 108. The data processing system 102 includes image processing software 114 that processes the sensor data 116 to produce the digital image 108. The digital image 108 represents the photographic image recorded on the film 106. At step 510, the digital image 108 is output to one or more output devices 110, such as monitor 110a, printer 110b, network system 110c, storage device 110d, computer system 110e, and the like.

FIG. 5B is a flowchart of another embodiment of a method for developing and processing film. This method may be used with one or more embodiments of the system 100 that includes the development system 122 having the halt station 222. This method is similar to the method described in FIG. 5A, with the exception that development of the film 106 is substantially stopped by the halt station 222.

The method begins at step 520, where the transport system 120 advances the film 106 to the applicator station 200. At step 522, processing solution 204 is applied to the film 106. The processing solution 204 initiates production of silver grains and at least one dye image within the film 106. At step 524, the film 106 is advanced through the development station 202 where the dye images and silver develop within the film 106. At step 526, the continued development of the film 106 is retarded or substantially stopped by the halt station 222. Retarding or substantially stopping the continued development of the film 106 allows the film 106 to be scanned using visible light 320 without fogging the film 106 during the scanning process. For example, if the development of the film 106 is stopped, the film 106 can be exposed to visible light without negatively affecting the scanning process. The halt station 222 may comprise a number of embodiments. For example, the halt station 222 may apply a halt solution 224, such as a bleach solution, fixer solution, blix solution, stop solution and the like. The halt solution 224 may also operate to stabilize the film 106. The halt station 222 may also comprise a wiper, drying system, cooling system and the like. At step 528, the film 106 is scanned by the scanning system 124 using light 320 having at least one frequency within the visible portion of the electromagnetic spectrum, i.e., visible light. At step 530, the sensor data 116 is processed to produce the digital image 108. At step 532, the digital image 108 is output to one or more output devices 110, such as monitor 110a, printer 110b, network system 110c, storage device 110d, computer system 110e, and the like.

While the invention has been particularly shown and described in the foregoing detailed description, it will be understood by those skilled in the art that various other changes in form and detail may be made without departing from the spirit and scope of the invention.

What is claimed is:

1. A digital film development system comprising:

a user interface operable to receive user data from a user;

a film loader operable to receive a film from the user and automatically load the film into the digital film development system;

a film processing system operable to substantially uniformly apply a processing solution to the film by an applicator to initiate development of the film;

a scanning system operable to scan the film and produce sensor data;

a data processing system operable to receive the sensor data and process the sensor data to produce one or more digital images; and at least one digital image outputted to a printer operable to print the at least one digital image.

2. The digital film development system of claim 1, wherein the film loader also operates to inspect the film.

3. The digital film development system of claim 1, wherein the user interface includes at least one point-of-sale device.

4. The digital film development system of claim 1, wherein the user interface includes at least one monitor.

5. The digital film development system of claim 1, further comprising a network connection operable to output the at least one digital image over a network.

6. The digital film development system of claim 1, wherein the digital film development system includes the printer.

7. A method for developing film in a film processing system comprising:

receiving user data entered by a user;

receiving a film canister;

outputting a receipt to the user having a code and indicating the time the film processing will be completed;

developing the film;

scanning the film using visible light to produce sensor data;

processing the sensor data to produce one or more digital images;

saving the digital images;

receiving the code from the user after the indicated time the film processing will be completed; and displaying the save digital images to the user on a monitor.

8. The method of claim 7, further comprising:

receiving user choices entered by the use while the saved digital images are displayed on the monitor; and processing the one or more digital images in accordance with the user choices.

9. The method of claim 8, wherein the user choices include printing at least one digital image.

10. The method of claim 8, wherein the user choices include transmitting the at least one digital image over a network.

11. The method of claim 7, wherein scanning the film comprises sensing visible light transmitted through the film.

12. The method of claim 7, wherein the method for developing the film is embodied in a free standing film processing kiosk.

13. The method of claim 7, wherein receiving user data by the user comprises receiving user data from a touch screen monitor.

14. A method for processing film comprising:

receiving a film canister containing exposed film;

removing automatically from the film canister the exposed film;

applying a processing solution to the exposed film;

heating the exposed film and processing solution in a controlled environment to develop the exposed film and form one or more dye images and corresponding silver images within the film;

scanning the exposed film to detect the dye images and produce sensor data representative of the dye images;

processing the sensor data to produce one or more digital images; and printing at least one digital image.

15. The method of claim 14, wherein receiving the film canister comprises receiving the film canister from a user containing exposed film.

16. The method of claim 14, wherein scanning the exposed film comprises scanning the exposed film using visible light.

17. The method of claim 14, further comprising transmitting the at least one digital image over a network.

18. The method of claim 14, wherein applying a processing solution comprises coating the processing solution to the exposed film using a slot vector.

19. The method of claim 14, wherein applying the processing solution comprises applying the processing solution to the exposed film using a removable cartridge processing solution.

20. The method of claim 14, further comprising arresting the continued development of the exposed film.

21. The digital film development system of claim 1, wherein the film processing system comprises an environmental chamber.

22. The digital film development system of claim 21, wherein the environmental chamber maintains a controlled temperature and humidity as the film is processed.

23. The method for processing film of claim 14, wherein the controlled environment has relative constant levels of heat and humidity.

* * * * *